(12) United States Patent
Bumgardner et al.

(10) Patent No.: US 7,913,414 B2
(45) Date of Patent: Mar. 29, 2011

(54) NUT PLATE GRIP GAGE

(75) Inventors: Mark D. Bumgardner, Enumclaw, WA (US); Terry L. Gesell, Lake Tapps, WA (US); Curtis L. Chamberlin, Shelton, WA (US); Paul C. Buehler, Snohomish, WA (US); Ed Vallejos, Lake Tapps, WA (US)

(73) Assignee: The Boeing Company, Chicago, IL (US)

( * ) Notice: Subject to any disclaimer, the term of this patent is extended or adjusted under 35 U.S.C. 154(b) by 176 days.

(21) Appl. No.: 12/406,301

(22) Filed: Mar. 18, 2009

(65) Prior Publication Data

US 2010/0236087 A1    Sep. 23, 2010

(51) Int. Cl.
*G01B 5/18* (2006.01)
(52) U.S. Cl. ............................................ 33/836; 33/806
(58) Field of Classification Search .................... 33/783, 33/806, 810, 832, 833, 834, 836; 269/48.1, 269/48.2; 7/164
See application file for complete search history.

(56) References Cited

U.S. PATENT DOCUMENTS

| | | | | |
|---|---|---|---|---|
| 1,248,340 | A | | 11/1917 | Kinney |
| 2,267,328 | A | * | 12/1941 | Finkle ........................... 269/48.2 |
| 2,439,531 | A | * | 4/1948 | Wallace ........................ 269/48.4 |
| 2,894,331 | A | * | 7/1959 | Stratman ......................... 33/806 |
| 4,033,043 | A | * | 7/1977 | Cunningham ................... 33/806 |
| 4,216,585 | A | | 8/1980 | Hatter |
| 4,237,612 | A | * | 12/1980 | Christian et al. ................ 33/784 |
| 4,876,800 | A | | 10/1989 | Pekar et al. |
| 4,892,449 | A | * | 1/1990 | Croxton ......................... 411/54 |
| 5,095,638 | A | * | 3/1992 | David et al. ..................... 33/783 |
| 6,056,283 | A | * | 5/2000 | Gage et al. ....................... 269/49 |
| 7,065,897 | B2 | | 6/2006 | Luner et al. |
| 7,070,375 | B2 | * | 7/2006 | Hoeckelman ................... 411/54 |
| 7,200,256 | B2 | | 4/2007 | Rose et al. |
| 7,596,846 | B2 | * | 10/2009 | Hoeckelman ................ 29/407.1 |

FOREIGN PATENT DOCUMENTS

FR        2650067 A1 * 1/1991
JP        63241301 A  * 10/1988

* cited by examiner

*Primary Examiner* — R. Alexander Smith
(74) *Attorney, Agent, or Firm* — Yee & Associates, P.C.; Dennis R. Plank

(57) ABSTRACT

An apparatus comprises a housing, a clamping unit associated with the housing, a biasing system, and a length indicator. The clamping unit can be inserted through a hole in a structure into an interior of a nut that is positioned relative to a first surface of the structure. The clamping unit can engage the interior of the nut when a portion of the housing is positioned relative to a second surface of the structure. The first structure is substantially parallel to the second surface. The biasing system can bias the portion of the housing positioned relative to the second surface of the structure and the clamping unit towards each other, while the clamping unit is engaged with the interior of the nut. The length indicator can indicate a length of a bolt when the biasing system has biased the portion of the housing and the clamping unit towards each other.

20 Claims, 11 Drawing Sheets

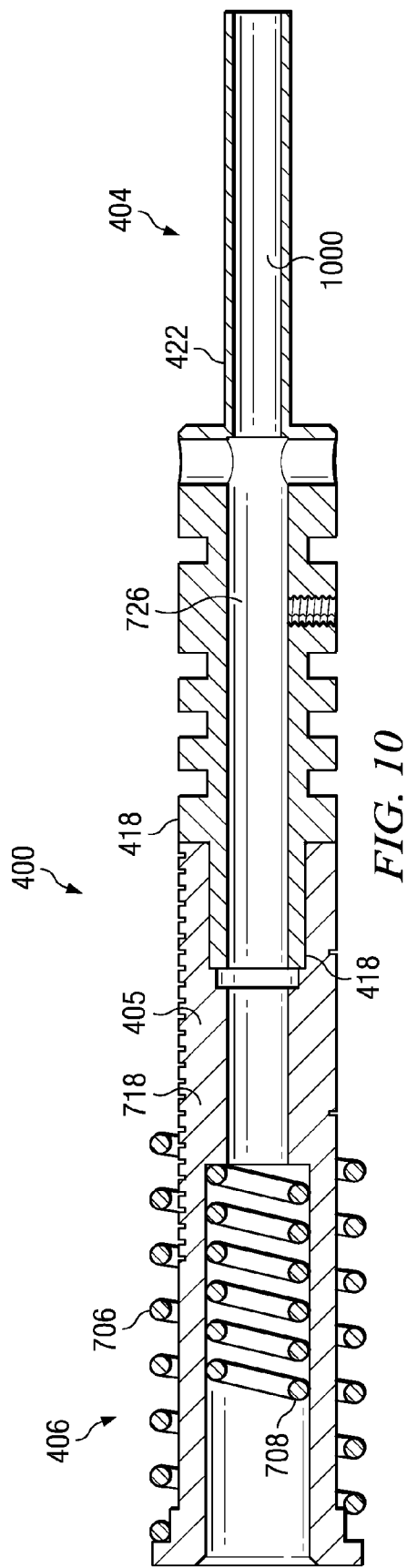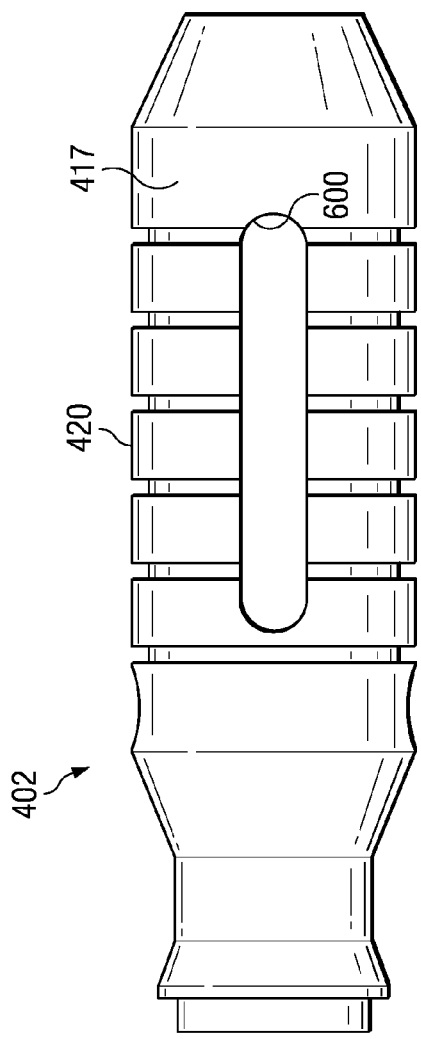

NUT PLATE GRIP GAGE

BACKGROUND INFORMATION

1. Field

The present disclosure relates generally to manufacturing objects and, in particular, to a method and apparatus for measuring the thickness of a structure. Still more particularly, the present disclosure relates to a method and apparatus for measuring the thickness of a structure to identify a bolt length.

2. Background

Parts may be fastened to each other using a number of different types of fastener systems. These fastener systems may include, for example, without limitation, rivets, bolts and nuts, and other suitable types of fastener systems. The use of a bolt and a nut provides a capability to fasten parts together to form a structure. Further, with the use of a bolt and a nut, a capability exists to more easily disassemble the structure at a later point in time as compared to other fastener systems, such as rivets.

In some cases, a typical hex nut may be impractical, increase maintenance efforts, and/or increase difficulty in disassembly. In these situations, a nut in the form of a nut plate is often used.

A nut plate also may be used in blind mount applications. For example, the bolt may be screwed into a structure for which the side on which the nut is to be placed is inaccessible. With this type of installation, a nut plate may be secured to the side of the structure that will be inaccessible. The nut plate may be secured using rivets, adhesive, and/or other types of attachment techniques. These nut plates may have fixed or floating nuts and may be covered with a fluid tight housing.

When using a nut plate, a hole is drilled through the structure with a desired diameter to accommodate a bolt. The diameter of the hole may be used to identify the diameter of the threaded hole to select the nut plate. The diameter of the threaded hole in the nut plate is typically approximately equal to or slightly less than the diameter of the hole through the structure. Although the diameter of the hole may be established, the length of the bolt needed to pass through the hole of the structure and become threaded with a desired tightness in the nut plate is not always easy to identify. Further, it is desirable for the threaded end of the bolt to protrude or extend a selected distance beyond the nut plate.

After a nut plate is installed and the structure is in place, a selected bolt is inserted into the hole and engages the nut plate to secure the structure in place and/or together. With this type of fastening system, the bolt may have a shank having a smooth section and a threaded section. It is often desirable to have the threaded section present in the portion of the shank that engages the nut plate. Having a threaded portion that may bear or rub against the structure is undesirable.

Measurements may be made to identify a grip length for the bolt. The grip length is the smooth part of the shank that has no threading. Further, the smooth part of the shank also should not engage the nut. This type of situation may result in an inability to tighten a fastener to the desired amount.

If the measurements are incorrect, the bolt may be removed and replaced with a new bolt having a shank with the correct length for the smooth section and the threaded section.

Therefore, it would be advantageous to have a method and apparatus that takes into account one or more of the issues discussed above, as well as possibly other issues.

SUMMARY

In one advantageous embodiment, an apparatus comprises a housing, a clamping unit associated with the housing, a biasing system, and a length indicator. The clamping unit is capable of being inserted through a hole in a structure into an interior of a nut that is positioned relative to a first surface of the structure. The clamping unit is also capable of engaging the interior of the nut when a portion of the housing is positioned relative to a second surface of the structure. The first structure is substantially parallel to the second surface. The biasing system is capable of biasing the portion of the housing that is positioned relative to the second surface of the structure and the clamping unit towards each other, while the clamping unit is engaged with the interior of the nut. The length indicator is capable of indicating a length when the biasing system has biased the portion of the housing and the clamping unit towards each other.

In another advantageous embodiment, a nut plate grip gage comprises a housing, a handle system, a second handle, a collet, a mandrel, a biasing system, and a length indicator. The handle system is associated with the housing. The collet has a channel and is associated with the housing. The collet is capable of being inserted through a hole in a structure into an interior of a nut plate that is positioned relative to a first surface of the structure. The collet is also capable of engaging the interior of the nut plate when a portion of the housing is positioned relative to a second surface of the structure. The first surface is substantially parallel to the second surface. The mandrel is located within the channel in the collet and is connected to the second handle. The mandrel is capable of being moved within the channel when the handle system is manipulated such that the collet engages the interior of the nut plate. The biasing system is capable of biasing the portion of the housing towards the first surface of the structure, while the collet is engaged with the interior of the nut plate. The length indicator is capable of indicating a length for a bolt when the portion of the housing is biased against the first surface of the structure.

In yet another advantageous embodiment, a method is present for measuring a length for a bolt. A measurement apparatus is positioned relative to a hole having a nut that is positioned relative to the hole on a first surface of a structure. The measurement apparatus is positioned relative to the hole on a second surface of the structure. The first surface is substantially parallel to the second surface. The measurement apparatus comprises a housing, a clamping unit, a biasing system, and a length indicator. The clamping unit is associated with the housing and is capable of being inserted through the hole in the structure into an interior of the nut that is positioned relative to the first surface of the structure. The clamping unit is also capable of engaging the interior of the nut when a portion of the housing is positioned relative to the second surface of the structure. The biasing system is capable of biasing the portion of the housing that is positioned relative to the second surface of the structure and the clamping unit towards each other, while the clamping unit is engaged with the interior of the nut. The length indicator is capable of indicating the length of the bolt when the biasing system has biased the portion of the housing and the clamping unit towards each other. The clamping unit is moved into the hole and into the interior of the nut. The clamping unit is engaged with the interior of the nut. The portion of the housing is biased towards the first surface.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives, and advantages thereof, will best be understood by reference to the following detailed description of an advantageous embodiment of the present disclosure when read in conjunction with the accompanying drawings, wherein:

FIG. 10 is a diagram of a side view of a housing in accordance with an advantageous embodiment;

FIG. 11 is a diagram illustrating a slide barrel for a measurement apparatus in accordance with an advantageous embodiment;

DETAILED DESCRIPTION

Figure 1:
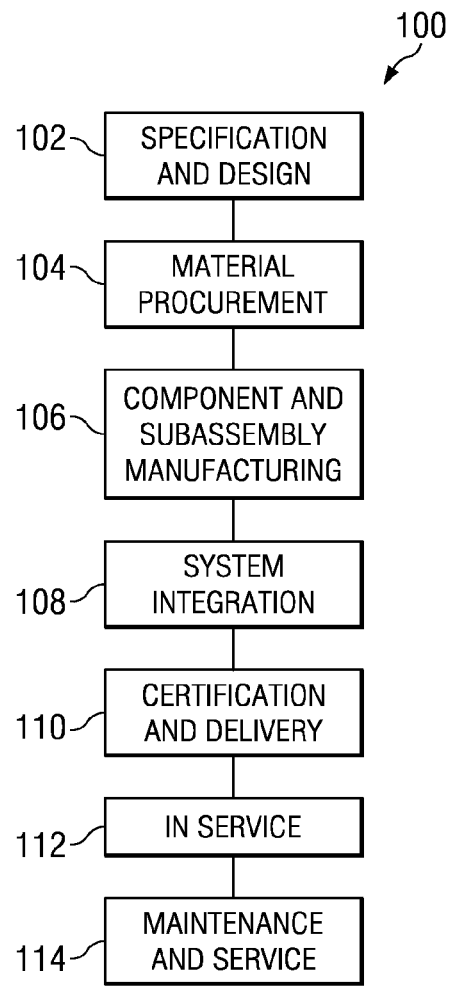
FIG. 1 is a diagram illustrating an aircraft manufacturing and service method in accordance with an advantageous embodiment.
Figure 2:
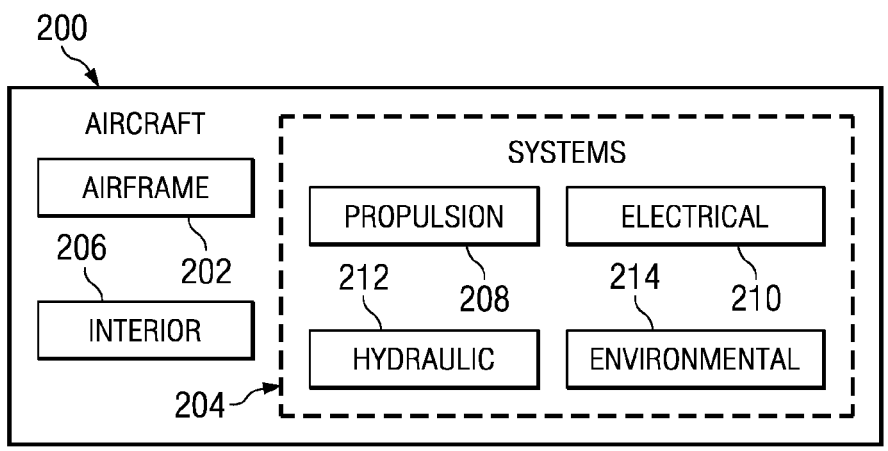
FIG. 2 is a diagram of an aircraft in which an advantageous embodiment may be implemented.

Referring more particularly to the drawings, embodiments of the disclosure may be described in the context of aircraft manufacturing and service method 100 as shown in FIG. 1 and aircraft 200 as shown in FIG. 2. Turning first to FIG. 1, a diagram illustrating an aircraft manufacturing and service method is depicted in accordance with an advantageous embodiment. During pre-production, exemplary aircraft manufacturing and service method 100 may include specification and design 102 of aircraft 200 in FIG. 2 and material procurement 104.

During production, component and subassembly manufacturing 106 and system integration 108 of aircraft 200 in FIG. 2 takes place. Thereafter, aircraft 200 in FIG. 2 may go through certification and delivery 110 in order to be placed in service 112. While in service by a customer, aircraft 200 in FIG. 2 is scheduled for routine maintenance and service 114, which may include modification, reconfiguration, refurbishment, and other maintenance or service.

Each of the processes of aircraft manufacturing and service method 100 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of venders, subcontractors, and suppliers; and an operator may be an airline, leasing company, military entity, service organization, and so on.

With reference now to FIG. 2, a diagram of an aircraft is depicted in which an advantageous embodiment may be implemented. In this example, aircraft 200 is produced by aircraft manufacturing and service method 100 in FIG. 1 and may include airframe 202 with a plurality of systems 204 and interior 206. Examples of systems 204 include one or more of propulsion system 208, electrical system 210, hydraulic system 212, and environmental system 214. Any number of other systems may be included. Although an aerospace example is shown, different advantageous embodiments may be applied to other industries, such as the automotive industry.

Apparatus and methods embodied herein may be employed during any one or more of the stages of aircraft manufacturing and service method 100 in FIG. 1. For example, components or subassemblies produced in component and subassembly manufacturing 106 in FIG. 1 may be fabricated or manufactured in a manner similar to components or subassemblies produced while aircraft 200 is in service 112 in FIG. 1.

Also, one or more apparatus embodiments, method embodiments, or a combination thereof may be utilized during production stages, such as component and subassembly manufacturing 106 and system integration 108 in FIG. 1, for example, without limitation, by substantially expediting the assembly of or reducing the cost of aircraft 200. Similarly, one or more of apparatus embodiments, method embodiments, or a combination thereof may be utilized while aircraft 200 is in service 112 or during maintenance and service 114 in FIG. 1.

For example, one or more of the different advantageous embodiments may be employed during component and subassembly manufacturing 106 and/or during maintenance and service 114 in FIG. 1 to identify bolts for use with nuts, such as nut plates. The different advantageous embodiments may be used to increase the accuracy at which a bolt with a desired grip length and/or overall length may be identified.

The different advantageous embodiments recognize and take into account a number of different considerations. For example, the different advantageous embodiments recognize and take into account that determining bolt length requirements may be more difficult with currently available gages. Currently available gages may provide inaccurate readings due to tolerance variables. The different advantageous embodiments recognize and take into account that measurements for a given length of a bolt using a currently available measurement gage may not meet tolerances, especially with floating nut plates.

A floating nut plate is a nut plate having a nut that may float or move within the plate. With this type of nut plate, a currently used measurement gage may cause the nut to travel away from the nut plate by a variable tolerance when these gages are placed into the hole associated with the nut plate to make a measurement for the bolt. The different advantageous embodiments recognize and take into account that this tolerance may require the bolt to be removed and replaced with one having a correct length.

Thus, the different advantageous embodiments provide a method and apparatus for identifying a bolt for use in a fastening system. The different advantageous embodiments may be used to identify a length of a bolt.

In the different advantageous embodiments, the apparatus may comprise a housing, a clamping unit, a biasing system, and a length indicator. The clamping unit is associated with the housing. The clamping unit is capable of being inserted through a hole in a structure into an interior of a nut positioned relative to a first surface of the structure and is capable of engaging an interior of the nut when a portion of the housing is positioned relative to a second surface of the structure.

The first surface is substantially parallel to the second surface. The biasing system is capable of biasing the portion of the housing positioned relative to the second surface of the structure and the clamping unit towards each other, while the clamping unit is engaged with the interior of the nut. The length indicator is associated with the housing and is capable of indicating a length of a bolt when the biasing system has biased the portion of the housing and the clamping unit towards each other.

In the different advantageous embodiments, one component may be associated with another component in a number of different ways. For example, the clamping unit may be associated with the housing by being attached to, bonded to, welded to, or otherwise being secured to the housing. Further, the clamping unit may be associated with the housing by being an extension or part of the housing. As another example, when one component is associated with another component, the component may be moveably attached to the other component. A number, as used herein, when referring to items refers to one or more items. For example, a number of ways is one or more ways in these examples.

In these examples, one item may be positioned relative to another item in a number of different ways. For example, a nut may be positioned relative to a surface by being adjacent to, touching, or some distance away from the surface.

Figure 3:
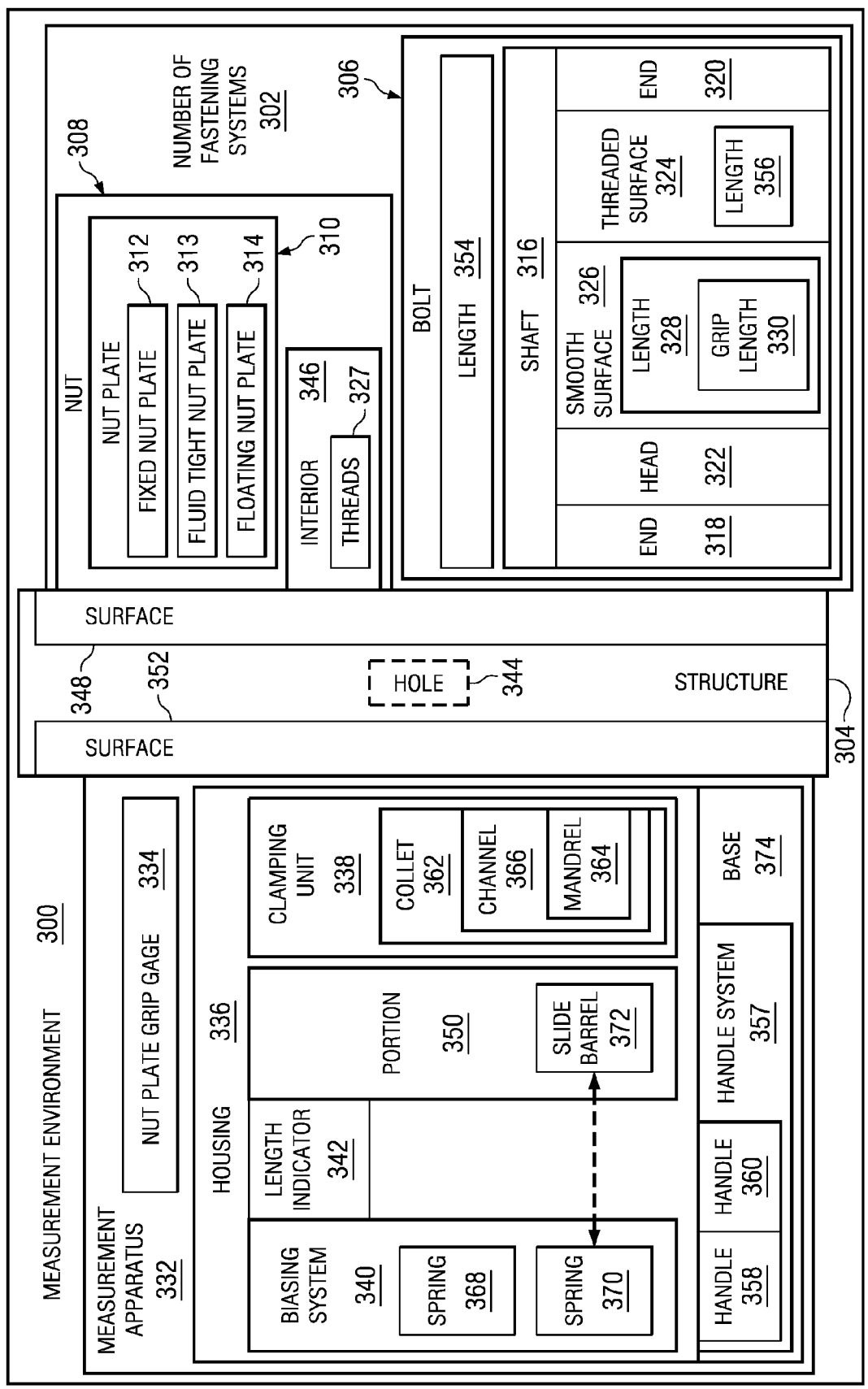
FIG. 3 is a diagram of a measurement environment in accordance with an advantageous embodiment.

Turning now to FIG. 3, a diagram of a measurement environment is depicted in accordance with an advantageous embodiment. Measurement environment 300 may be used to identify number of fastening systems 302 for use with structure 304. Structure 304 may be a structure for aircraft 200 in FIG. 2 in these examples. The identification of number of fastening systems 302 may include bolt 306 and nut 308. Nut 308 may take the form of nut plate 310.

In these illustrative examples, nut plate 310 may be a metal sheet with a threaded hole that can be attached to structure 304. In particular, nut plate 310 may be riveted to structure 304 for use. Nut plate 310 may take the form of fixed nut plate 312 or floating nut plate 314. Fixed nut plate 312 is a one-piece nut plate, while floating nut plate 314 has a floating nut or replaceable locking element. As yet another example, nut plate 310 may be fluid tight nut plate 313. Fluid tight nut plate 313 may be a nut plate having a fixed or floating nut that is covered with a fluid tight housing.

In these illustrative examples, bolt 306 has shaft 316 with end 318 and end 320. Head 322 is located at end 318, and threaded surface 324 is located at end 320. Smooth surface 326 is located on shaft 316 between head 322 and threaded surface 324. Length 328 of smooth surface 326 is grip length 330 for bolt 306 in these examples.

In the different advantageous embodiments, measurement apparatus 332 is used to identify grip length 330 for bolt 306 for use with nut 308. Measurement apparatus 332 may take the form of nut plate grip gage 334. Measurement apparatus 332 has housing 336, clamping unit 338, biasing system 340, and length indicator 342.

In these illustrative examples, clamping unit 338 is associated with housing 336. In other words, clamping unit 338 may be attached to, adhered to, or extend from housing 336. In these examples, clamping unit 338 may engage threads 327 in interior 346 of nut 308. Clamping unit 338 is capable of being inserted into hole 344 in structure 304 into interior 346 of nut 308 relative to surface 348 of structure 304 and capable of engaging interior 346 of nut 308 when portion 350 of housing 336 is positioned relative to surface 352 of structure 304. Surface 348 is substantially parallel to surface 352 in these examples.

Biasing system 340 is capable of biasing portion 350 of housing 336 that is positioned relative to surface 352 of structure 304 and clamping unit 338 towards each other, while clamping unit 338 is engaged with interior 346 of nut 308.

Length indicator 342 is associated with housing 336 and is capable of indicating length 354 of bolt 306. For example, length indicator 342 may have marks and/or lines representing lengths. Length 354 may be the entire length of bolt 306, which may be used to identify grip length 330. Grip length 330 may be identified by subtracting length 356 of threaded surface 324 from length 354 of bolt 306. In some advantageous embodiments, length 354 may be grip length 330.

In these illustrative examples, measurement apparatus 332 also may include handle system 357, which may comprise handle 358 and handle 360. Handle 358 and handle 360 are associated with housing 336. As illustrated, handle 358 is connected to housing 336, while handle 360 is moveably connected to handle 358. Handle 358 and handle 360 are capable of being moved relative to each other.

In these illustrative examples, clamping unit 338 is capable of being moved into hole 344 and interior 346 of nut 308 when handle 358 and handle 360 are moved towards each other. Biasing system 340 is capable of biasing handle 360 away from handle 358 when biasing portion 350 of housing 336, which is positioned relative to surface 352 of structure 304, and clamping unit 338 towards each other, while clamping unit 338 is engaged with interior 346 of nut 308.

Clamping unit 338 may comprise collet 362 and mandrel 364. Collet 362 is a holding device. Collet 362 has channel 366. Mandrel 364 is connected to biasing system 340 and located within channel 366 of collet 362. Mandrel 364 is capable of being moved by biasing system 340 to cause collet 362 to expand while in interior 346 of nut 308. This expansion of collet 362 causes collet 362 to engage interior 346 and hole 344 in nut 308 in these illustrative examples. In these examples, mandrel 364 may be connected to biasing system 340 through a rod.

Biasing system 340 may comprise spring 368 and spring 370. Spring 368 is capable of biasing clamping unit 338 to engage interior 346 of nut 308. For example, without limitation, spring 368 may bias mandrel 364 to cause collet 362 to expand in a manner that engages interior 346 of nut 308. Spring 370 is capable of biasing portion 350 of housing 336, which is positioned relative to surface 352 of structure 304, and collet 362 towards each other while collet 362 is engaged with interior 346 of nut 308.

In these illustrative examples, portion 350 of housing 336 may be slide barrel 372. Slide barrel 372 is a part of housing 336, may be connected to spring 370, and may move relative to base 374 of housing 336 in these illustrative examples.

The illustration of measurement apparatus 332 in measurement environment 300 in FIG. 3 is not meant to imply physical or architectural limitations to the manner in which different advantageous embodiments may be implemented. Other components in addition to and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

For example, in some advantageous embodiments, grip length 330 may be measured for nut 308 in the form of a hex nut rather than a nut plate. In yet other advantageous embodiments, the biasing of collet 362 may occur when handle 358 and handle 360 are moved towards each other rather than biased away from each other.

In still other advantageous embodiments, the measurement may be made by using a different type of control, such as a trigger or a switch attached to housing 336. In some advantageous embodiments, length indicator 342 may be an electronic gage generating signals that display grip length 330 and/or send grip length 330 to a remote computer or data processing system. As another example, collet 362 may be a plurality of metal strips that are biased outwards and extend out of a tube to engage interior 346 of nut 308.

Figure 4:
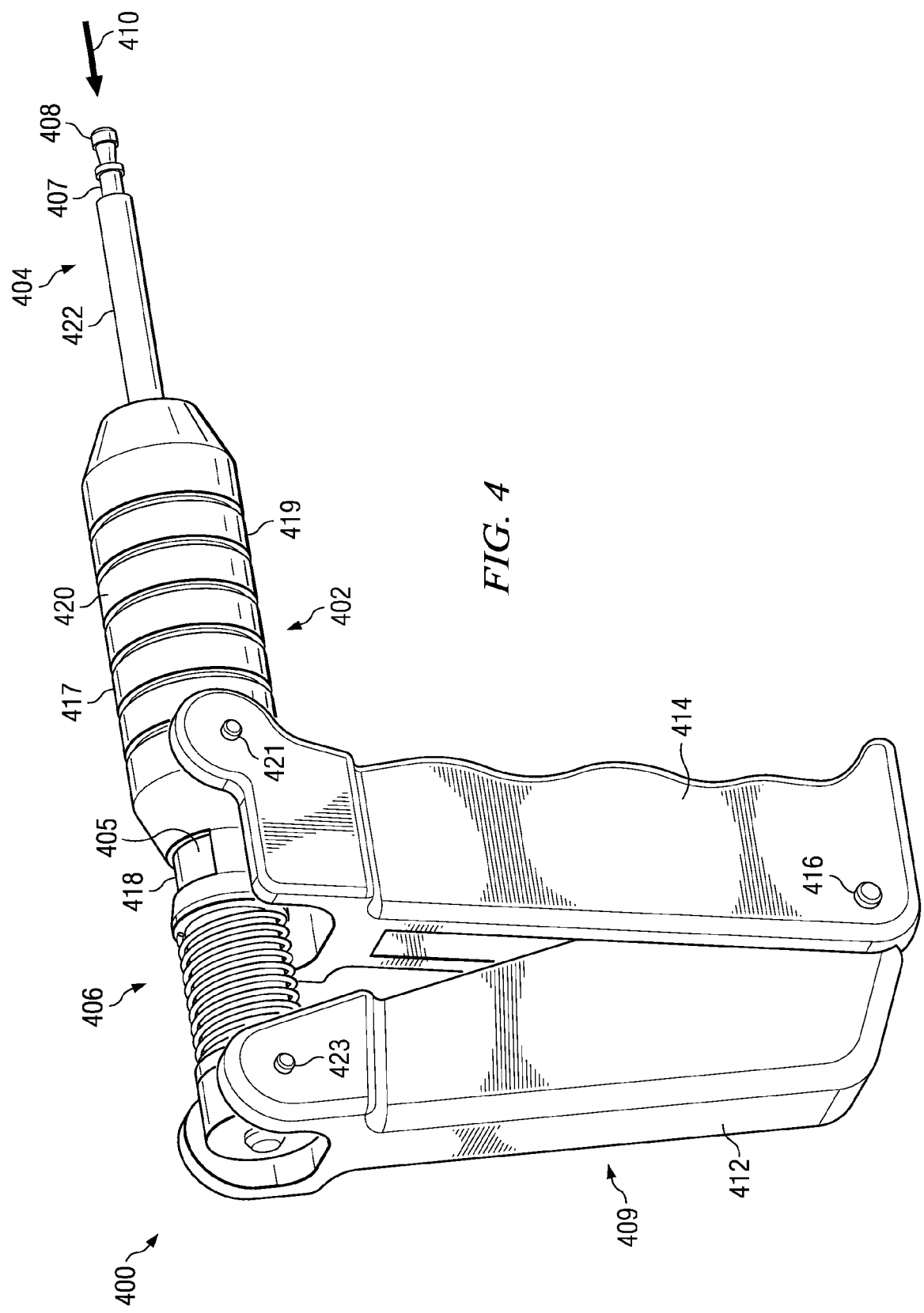
FIG. 4 is a diagram of a measurement apparatus in accordance with an advantageous embodiment.

Turning now to FIG. 4, a diagram of a measurement apparatus is depicted in accordance with an advantageous embodiment. Measurement apparatus 400 is an example of one implementation for measurement apparatus 332 in FIG. 3.

In this illustrative example, measurement apparatus 400 comprises housing 402, which has clamping unit 404, length indicator 405, biasing system 406, and handle system 409. Clamping unit 404 includes collet 407 and mandrel 408.

Handle system 409 includes handle 412 and handle 414, which may be manipulated by a human hand in these examples. Biasing system 406 may bias mandrel 408 in the direction of arrow 410 and bias handle 412 away from handle 414. In these examples, handle 412 is moveably connected to handle 414 by pin 416. Handle 414 may be moveably attached to housing 402 by pin 421, while handle 412 may be moveably connected to housing 402 by pin 423.

Housing 402 has side 417 and side 419 in these examples. Housing 402 may include base 418 and slide barrel 420. In these illustrative examples, collet 407 and mandrel 408 may be located within rod 422, which may be an extension from base 418.

Length indicator 405 provides an indication of a length for a bolt to be used with a nut plate. The indication by length indicator 405 is provided based on the position of slide barrel 420 relative to base 418. This length may be the entire non-threaded length of the shaft for the bolt and/or a grip length, depending on the particular implementation.

Figure 5:
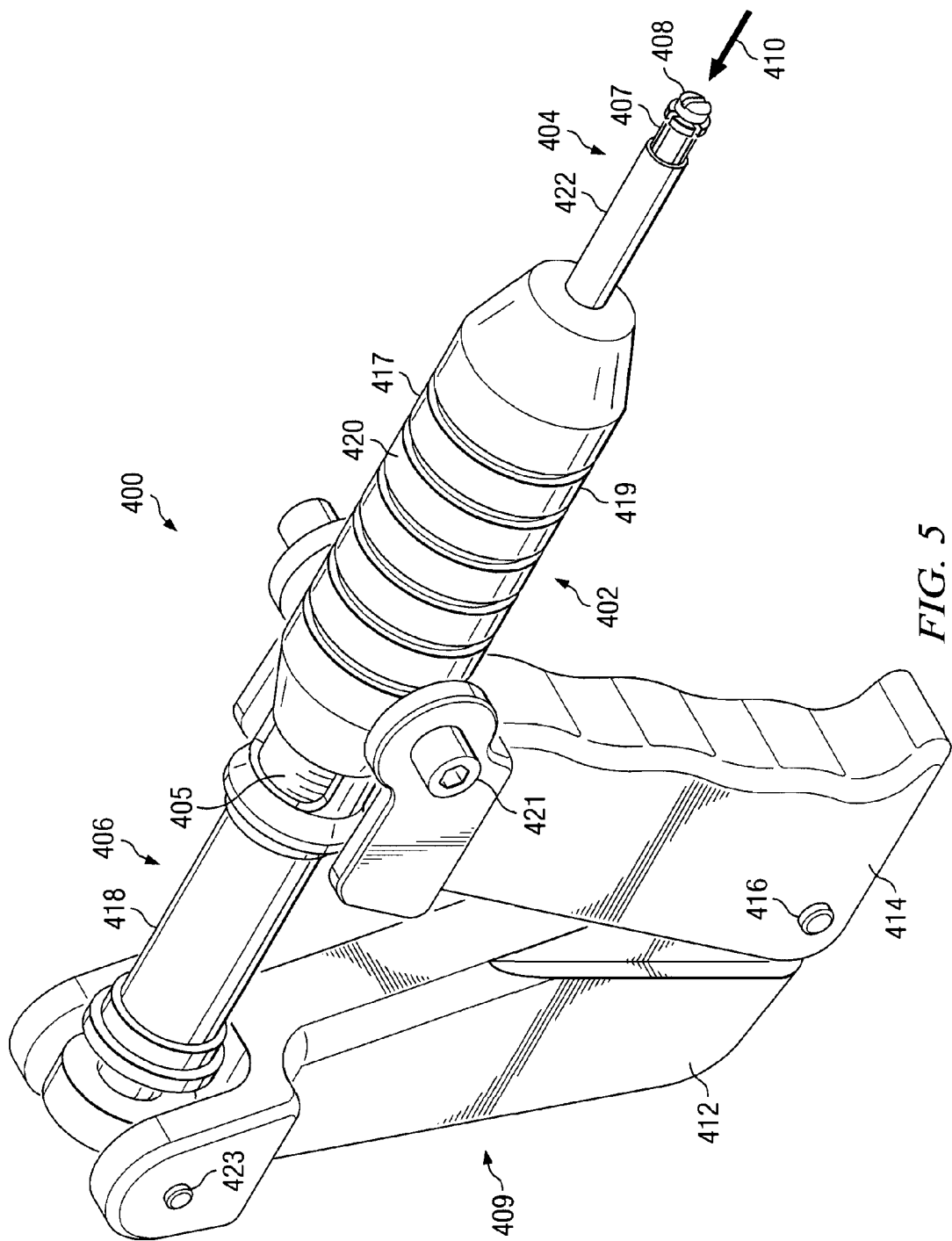
FIG. 5 is another diagram of a measurement apparatus in accordance with an advantageous embodiment.

With reference next to FIG. 5, another view of measurement apparatus 400 is depicted in accordance with an advantageous embodiment.

Figure 6:
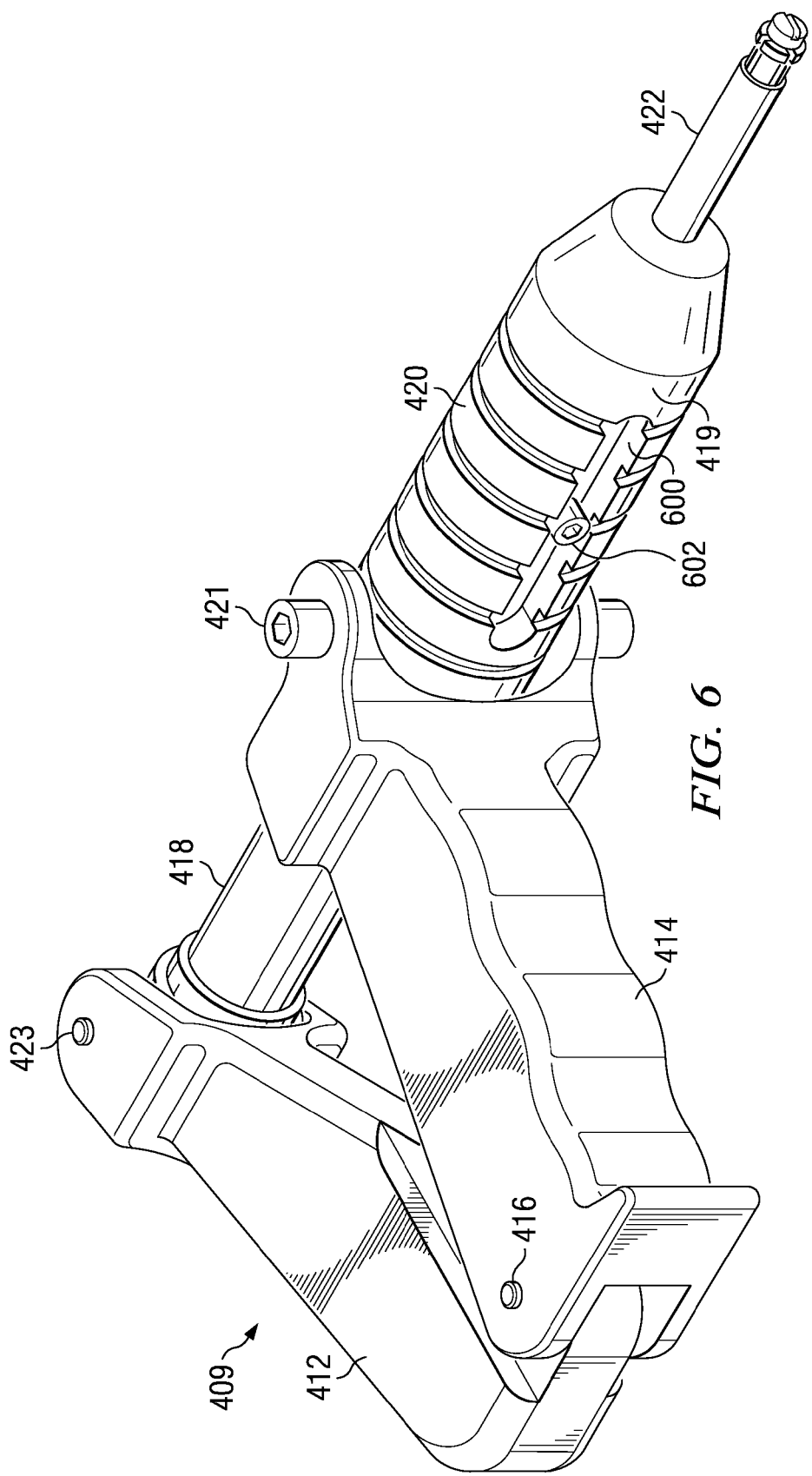
FIG. 6 is a diagram illustrating another view of a measurement apparatus in accordance with an advantageous embodiment.

Turning next to FIG. 6, a diagram illustrating another view of a measurement apparatus is depicted in accordance with an advantageous embodiment. In this illustrative view, slot 600 in slide barrel 420 may be seen. Slot 600 with screw 602 may control the movement of slide barrel 420 relative to base 418.

Figure 7:
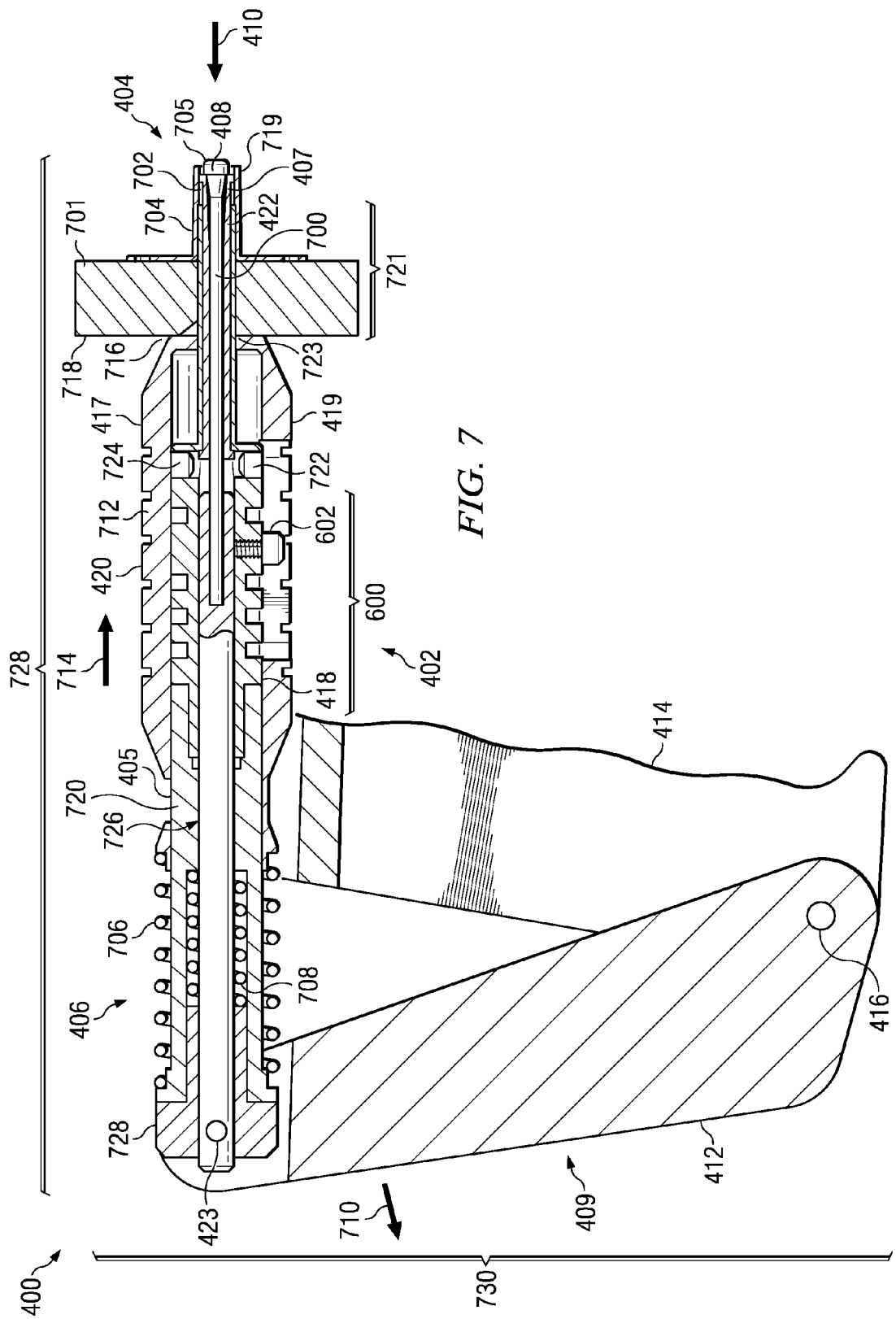
FIG. 7 is a cross-sectional view of a measurement apparatus in accordance with an advantageous embodiment.

Turning now to FIG. 7, a cross-sectional view of measurement apparatus 400 is depicted in accordance with an advantageous embodiment. Handle 412 and handle 414 may be squeezed to allow clamping unit 404 to be placed through hole 700 and into interior 702 of nut plate 704. In this illustrative example, rod 422 has been inserted into hole 700 in structure 701 and into interior 702 of nut plate 704.

Collet 407 has expanded in response to movement of mandrel 408 in the direction of arrow 410 to engage interior 702 of nut plate 704. Collet 407 may engage the first thread in nut plate 704 farthest from end 705. In these examples, point 719 may be a starting point from which measurements are made in nut plate 704. The measurement indicated by length indicator 405 may be length 721, which may be between point 723 on surface 718 of structure 701 and point 719 at the beginning of rod 422. Biasing unit 406 includes spring 706 and spring 708. Spring 706 causes handle 412 through rod 726 to be biased away from handle 414 in the direction of arrow 710.

In this illustrative example, mandrel 408 is connected to handle 412. When handle 412 moves away from handle 414, mandrel 408 is moved in the direction of arrow 410. Releasing handle 412 and handle 414 allows spring 708 to bias handle 412 away from handle 414 in the direction of arrow 710 to cause mandrel 408 to move in the direction of arrow 410 to cause collet 407 to expand and engage interior 702 of nut plate 704. In this illustrative example, spring 708 pushes against end cap 728 in the direction of arrow 410. End cap 728 may be attached to handle 412 with pin 423 in these illustrative examples. Additionally, pin 423 also may attach rod 422 to end cap 728 on handle 412.

Slide barrel 420 may move in the direction of arrow 714 and/or arrow 410 along base 418. Slot 600 in slide barrel 420 may engage base 418 when slide barrel 420 moves in the direction of arrow 714 and/or arrow 410. Screw 602 may control the amount of sliding movement made by slide barrel 420 along base 418.

Further, when handle 412 and handle 414 are released, spring 706 biases slide barrel 420 in the direction of arrow 714. Slide barrel 420 may move in the direction of arrow 714 until end 716 of slide barrel 420 contacts surface 718 of structure 701.

Slide barrel 420 is an example of one implementation for portion 350 of housing 336 in FIG. 3. Slide barrel 420 has end 716, which may move relative to surface 718 in structure 701. Movement of slide barrel 420 exposes portion 720 of length indicator 405. The different components in measurement apparatus 400 may be comprised of different materials. For example, without limitation, plastic, aluminum, steel, or some other suitable material may be used.

These actions reduce and/or eliminate gaps between nut plate 704 and structure 701. This may provide a more accurate reading for a grip length of a bolt. The grip length for the bolt may be obtained from the length indicated by length indicator 405 and subtracting the threaded length of nut plate 704.

As can be seen in this example, collet 407 may be secured to housing 402 by tapered set screws 722 and 724. Slide barrel 420 may slide relative to inner portion 726 of housing 402.

Measurement apparatus 400 may have various dimensions, depending on the particular implementation. In this illustrative example, measurement apparatus 400 has width 728 and height 730. Width 728 may be around seven inches, while height 730 may be around five inches. Of course, other dimensions and sizes may be used, depending on the particular embodiment.

Figure 8:
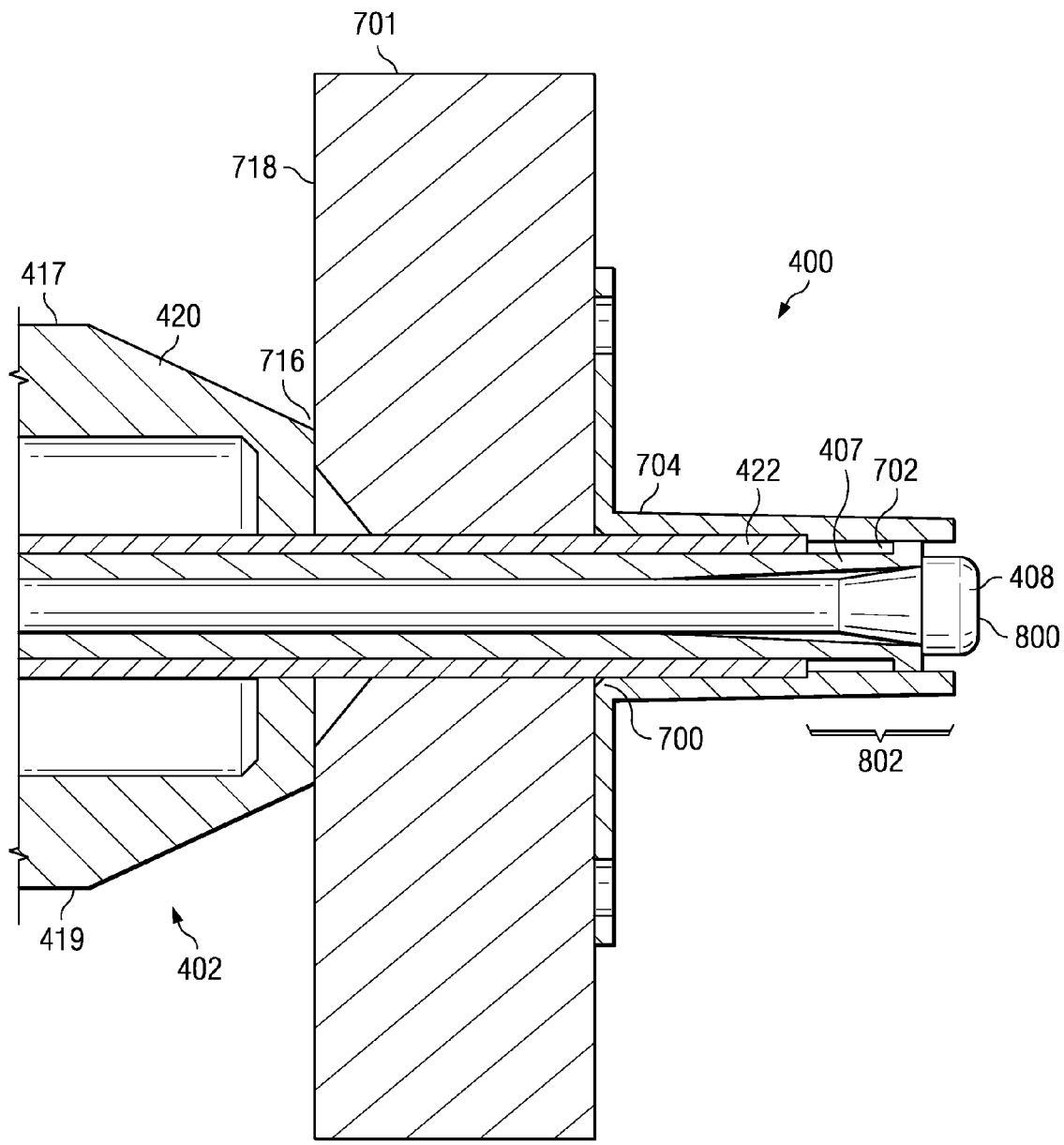
FIG. 8 is a cross-sectional view of a clamping unit in accordance with an advantageous embodiment.

With reference now to FIG. 8, a more detailed cross-sectional view of a clamping unit is depicted in accordance with an advantageous embodiment. As can be seen in this illustrative example, mandrel 408 has tapered end 800, which expands in diameter. In this example, collet 407 engages threaded section 802 of interior 702 of nut plate 704. Collet 407 engages the first thread reached by collet 407 in threaded section 802 in these illustrative examples.

Figure 9:
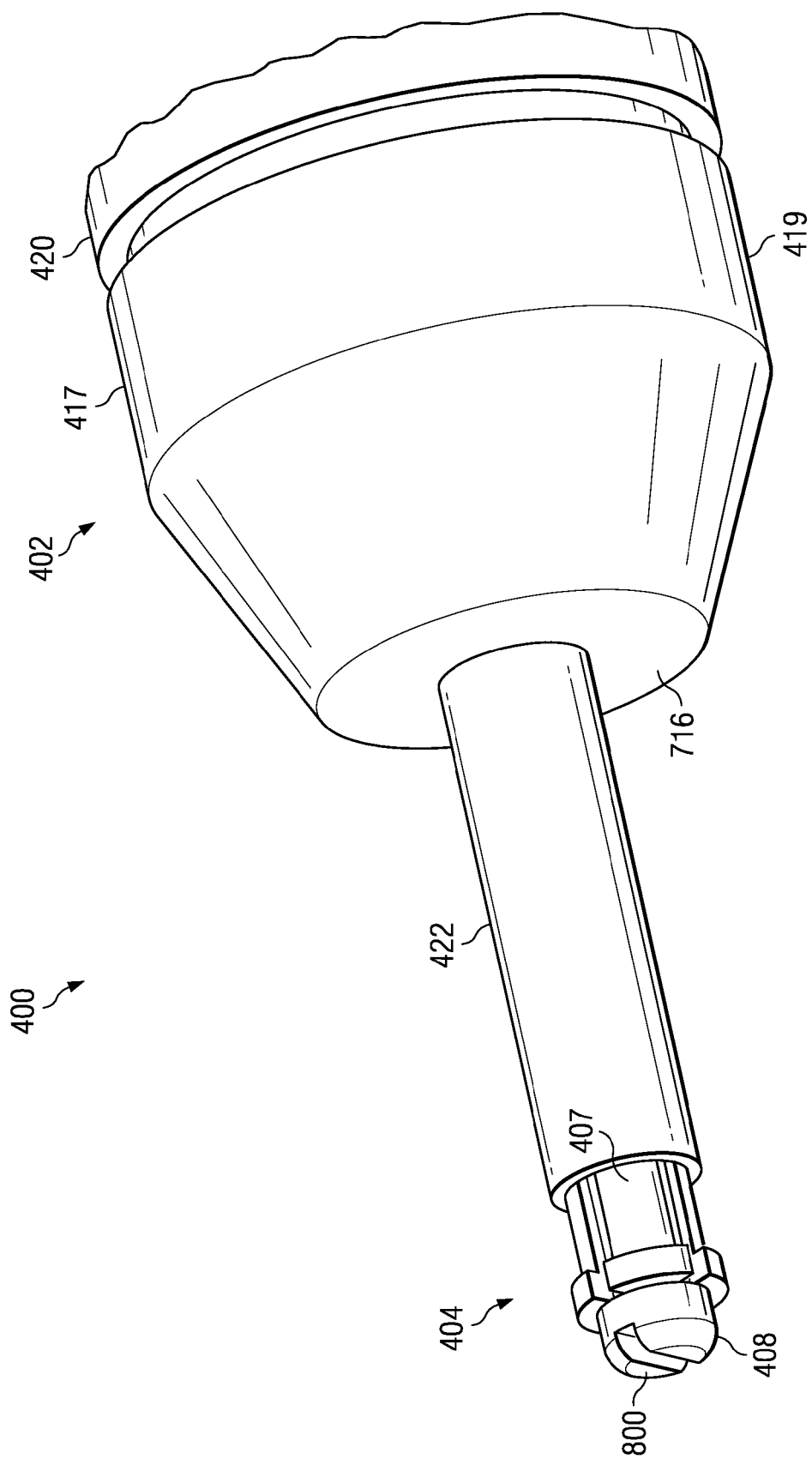
FIG. 9 is a diagram illustrating a perspective view of a clamping unit in accordance with an advantageous embodiment.

Turning now to FIG. 9, a diagram illustrating a perspective view of a clamping unit is depicted in accordance with an advantageous embodiment.

Turning now to FIG. 10, a side view of housing 402 is depicted in accordance with an advantageous embodiment. In this view, slide barrel 420 is not shown. Other components such as, for example, collet 407 and mandrel 408 also are not seen in this illustration. Channel 1000 is a location in which mandrel 408 and collet 407 may be located.

Turning now to FIG. 11, a diagram illustrating a slide barrel for a measurement apparatus is depicted in accordance with an advantageous embodiment. In this depicted example, slide barrel 420 is shown from side 419, which is a bottom view.

Figure 12:
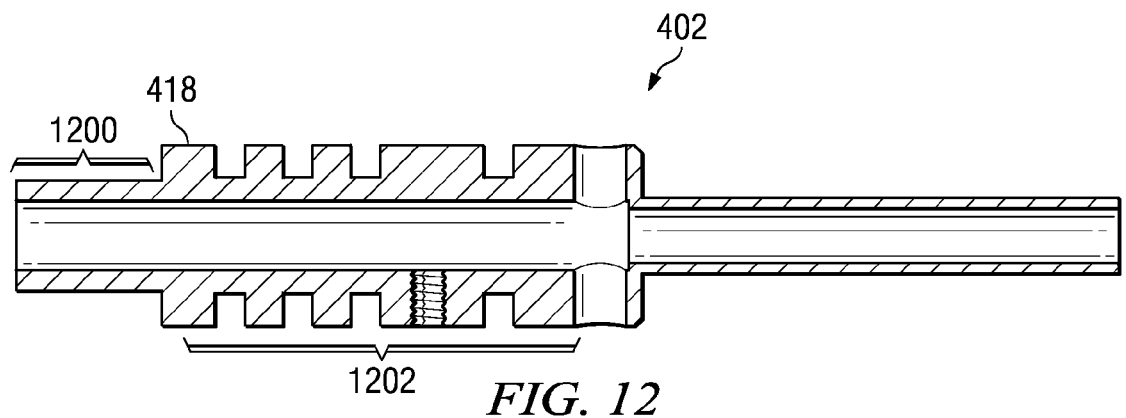
FIG. 12 is a diagram illustrating a portion of a housing in accordance with an advantageous embodiment.

With reference now to FIG. 12, a diagram illustrating a portion of housing 402 is depicted in accordance with an advantageous embodiment. In this illustrative example, a cross-sectional view of base 418 and housing 402 is depicted in accordance with an advantageous embodiment. Section 1200 may receive length indicator 405, while slide barrel 420 may slide on section 1202.

Figure 13:
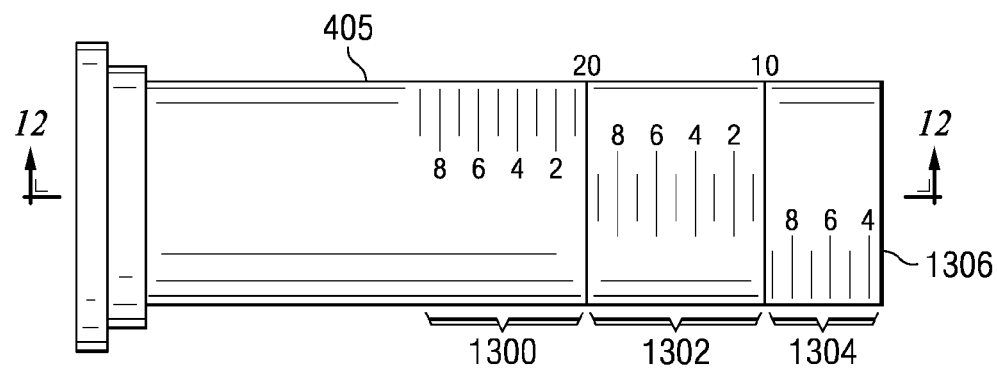
FIG. 13 is a diagram illustrating a length indicator in accordance with an advantageous embodiment.

Turning now to FIG. 13, a diagram illustrating a length indicator is depicted in accordance with an advantageous embodiment. In this illustrative example, length indicator 405 may provide lengths in section 1300, 1302, and 1304. These different lengths may provide indications for the grip length of a bolt, the total length of the bolt, including threads, and other suitable length indications for a bolt. End 1306 may be slid over section 1200 of base 418 as illustrated in FIG. 12.

Slide barrel 420 for housing 402 may selectively slide over sections 1300, 1302, and 1304 to provide length measurements.

The illustrations of the different views of measurement apparatus 400 in FIGS. 4-13 are examples of one implementation for measurement apparatus 332 in FIG. 3. In other advantageous embodiments, measurement apparatus 400 may take other forms. For example, in some advantageous embodiments, slide barrel 420 may have some other shape than that of a cylinder with different diameters. For example, slide barrel 420 may be square, octagonal, triangular, and/or some other suitable shape.

Figure 14:
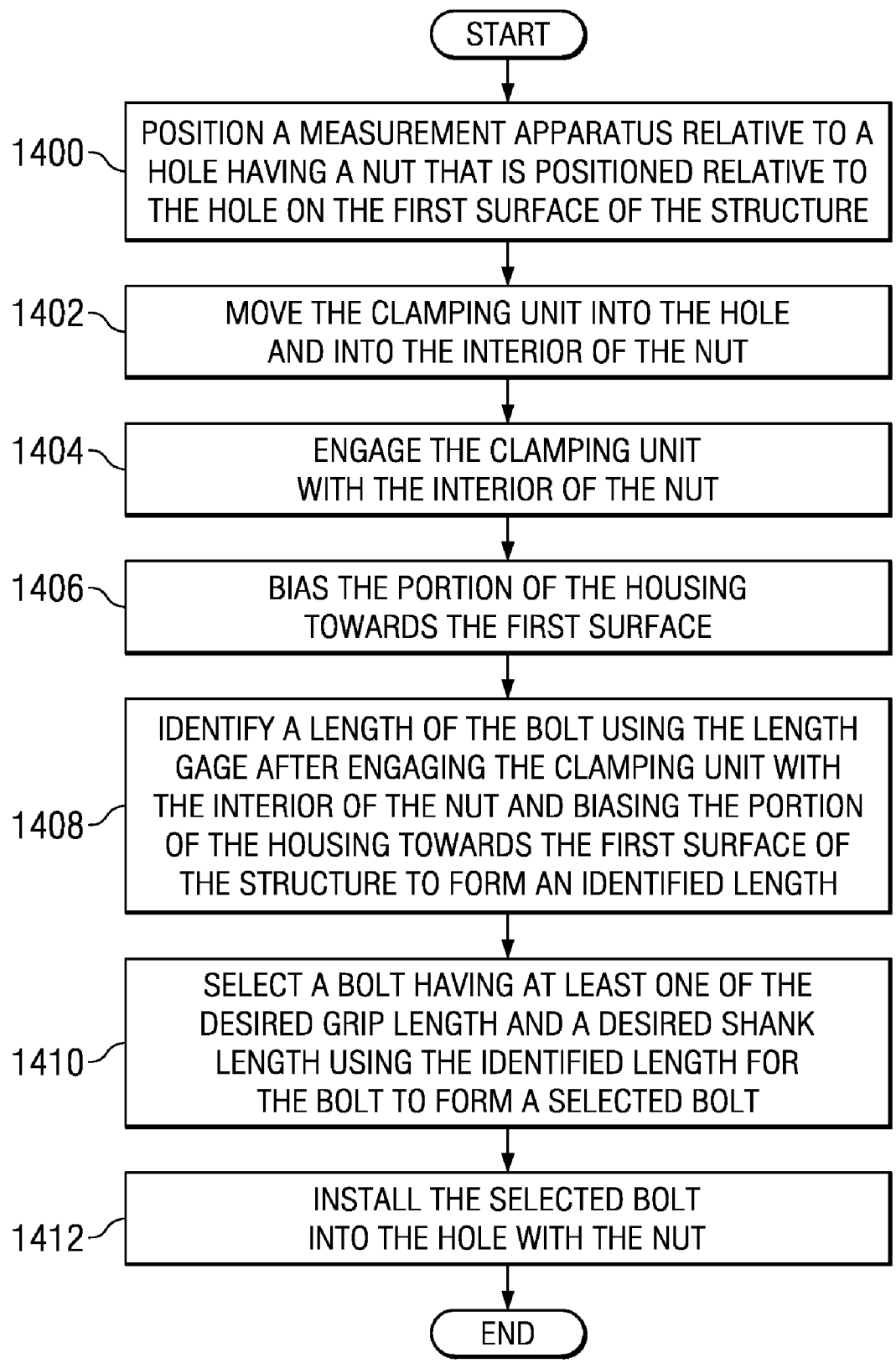
FIG. 14 is a flowchart of a process for measuring a length for a bolt in accordance with an advantageous embodiment.

Turning now to FIG. 14, a flowchart of a process for measuring a length for a bolt is depicted in accordance with an advantageous embodiment. The process illustrated in FIG. 14 may be implemented using a measurement environment such as, for example, measurement environment 300 in FIG. 3. In particular, the different advantageous embodiments may make measurements using a measurement apparatus, such as measurement apparatus 332 in the form of nut plate grip gage 334 in FIG. 3.

The process may begin by positioning a measurement apparatus relative to a hole having a nut that is positioned relative to the hole on the first surface of the structure (operation 1400). In this illustrative example, the measurement apparatus may be, for example, measurement apparatus 332 in FIG. 3. In particular, in one implementation, measurement apparatus 400 in FIG. 4 may be used. The process then moves the clamping unit into the hole and into the interior of the nut (operation 1402). The clamping unit is engaged with the interior of the nut (operation 1404), and the portion of the housing is biased towards the first surface (operation 1406).

A length of the bolt is then identified using the length indicator after engaging the clamping unit with the interior of the nut and biasing the portion of the housing towards the first surface of the structure to form an identified length (operation 1408). A bolt is then selected having at least one of the desired grip length and a desired shank length using the identified length for the bolt to form a selected bolt (operation 1410).

As used herein, the phrase "at least one of", when used with a list of items, means that different combinations of one or more of the listed items may be used and only one of each item in the list may be needed. For example, "at least one of item A, item B, and item C" may include, for example, without limitation, item A or item A and item B. This example also may include item A, item B, and item C or item B and item C.

In these illustrative examples, the length indicator may provide an indication of the length for the shank of the bolt. The grip length for the bolt may be identified by subtracting the length of the interior of the nut and/or the threaded portion of the interior of the nut from the length identified from the length indicator. The selected bolt is then installed into the hole with the nut (operation 1412), with the process terminating thereafter.

The flowcharts and block diagrams in the different depicted embodiments illustrate the architecture, functionality, and operation of some possible implementations of apparatus and methods in different advantageous embodiments. In this regard, each block in the flowcharts or block diagrams may represent a module, segment, function, and/or a portion of an operation or step. In some alternative implementations, the function or functions noted in the blocks may occur out of the order noted in the figures. For example, in some cases, two blocks shown in succession may be executed substantially concurrently, or the blocks may sometimes be executed in the reverse order, depending upon the functionality involved.

For example, operation 1404 and operation 1406 may occur at the same time. In yet other advantageous embodiments, insulation of a selected bolt may not occur until after measurements have been made for all of the holes in the structure.

The description of the different advantageous embodiments has been presented for purposes of illustration and description, and it is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus comprising:
   a housing;
   a clamping unit associated with the housing, wherein the clamping unit is capable of being inserted through a hole in a structure into an interior of a nut that is positioned relative to a first surface of the structure and capable of engaging the interior of the nut when a portion of the housing is positioned relative to a second surface of the structure, wherein the first surface is substantially parallel to the second surface;
   a biasing system capable of biasing the portion of the housing that is positioned relative to the second surface of the structure and the clamping unit, while the clamping unit is engaged with the interior of the nut;
   a length indicator capable of indicating a length when the biasing system has biased the portion of the housing and the clamping unit;
   a first handle; and
   a second handle, wherein the first handle and the second handle are associated with the housing and are capable of being moved relative to each other.

2. The apparatus of claim 1, wherein the biasing system is capable of biasing the portion of the housing against the second surface of the structure.

3. The apparatus of claim 1, wherein the biasing system is capable of biasing the clamping unit into a configuration such that the clamping unit is capable of being inserted through the hole in the structure into the interior of the nut positioned relative to the first surface of the structure and capable of engaging the interior of the nut when the portion of the housing is positioned relative to the second surface of the structure, wherein the first surface is substantially parallel to the second surface.

4. The apparatus of claim 1, wherein the first handle and the second handle are capable of being moved towards each other, wherein the clamping unit is in a configuration capable of being placed through the hole and into the interior of the nut when the first handle and the second handle are moved towards each other.

5. The apparatus of claim 4, wherein the biasing system is capable of biasing the first handle and the second handle away from each other when biasing the portion of the housing positioned relative to the second surface of the structure and the clamping unit towards each other while the clamping unit is engaged with the interior of the nut.

6. The apparatus of claim 1, wherein the clamping unit comprises:
   a collet having a channel; and
   a mandrel connected to the biasing system and located within the channel, wherein the mandrel is capable of being moved by the biasing system to cause the collet to expand while in the interior of the nut.

7. The apparatus of claim 6, wherein the mandrel is connected to the biasing system by a rod.

8. The apparatus of claim 6, wherein the length indicator is capable of indicating a length from a part of the portion of the housing touching the second surface to an end of the collet.

9. The apparatus of claim 1, wherein the biasing system comprises:
a first spring, wherein the first spring is capable of biasing the clamping unit to engage the interior of the nut; and
a second spring capable of biasing the portion of the housing positioned relative to the second surface of the structure and the clamping unit towards each other while the clamping unit is engaged with the interior of the nut.

10. The apparatus of claim 1, wherein the nut is selected from one of a fixed nut plate and a floating nut plate.

11. The apparatus of claim 1, wherein the length indicator is capable of indicating a grip length of the bolt.

12. A nut plate grip gage comprising:
a housing;
a handle system associated with the housing, the handle system including a first handle and a second handle;
a collet having a channel, wherein the collet is associated with the housing and is capable of being inserted through a hole in a structure into an interior of a nut plate that is positioned relative to a first surface of the structure and capable of engaging the interior of the nut plate when a portion of the housing is positioned relative to a second surface of the structure, wherein the first surface is substantially parallel to the second surface;
a mandrel located within the channel in the collet, wherein the mandrel is connected to the second handle and is capable of being moved within the channel when the handle system is manipulated such that the collet engages the interior of the nut plate;
a biasing system capable of biasing the portion of the housing, while the collet is engaged with the interior of the nut plate; and
a length indicator capable of indicating a length of a bolt when the portion of the housing is biased against the first surface of the structure.

13. The nut plate grip gage of claim 12, wherein the biasing system comprises:
a first spring capable of biasing the second handle away from the first handle; and
a second spring capable of biasing the portion of the housing towards the first surface of the structure.

14. The nut plate grip gage of claim 13, wherein the mandrel is connected to the second handle by a rod.

15. The nut plate grip gage of claim 12, wherein the portion is a slide barrel.

16. A method for measuring a length for a bolt, the method comprising:
positioning a measurement apparatus relative to a hole having a nut that is positioned relative to the hole on a first surface of a structure, wherein the measurement apparatus is positioned relative to the hole on a second surface of the structure, wherein the first surface is substantially parallel to the second surface, and wherein the measurement apparatus comprises a housing; a clamping unit associated with the housing, wherein the clamping unit is capable of being inserted through the hole in the structure into an interior of the nut that is positioned relative to the first surface of the structure and capable of engaging the interior of the nut when a portion of the housing is positioned relative to the second surface of the structure; a biasing system capable of biasing the portion of the housing that is positioned relative to the second surface of the structure and the clamping unit towards each other while the clamping unit is engaged with the interior of the nut; and a length indicator capable of indicating the length of the bolt when the biasing system has biased the portion of the housing and the clamping unit towards each other;
moving the clamping unit into the hole and into the interior of the nut;
engaging the clamping unit with the interior of the nut; and
biasing the portion of the housing towards the first surface with a biasing system comprising a first spring, wherein the first spring is capable of biasing the clamping unit to engage the interior of the nut; and
a second spring capable of biasing the portion of the housing positioned relative to the second surface of the structure and the clamping unit towards each other while the clamping unit is engaged with the interior of the nut.

17. The method of claim 16 further comprising:
identifying the length for the bolt from the length indicator after engaging the clamping unit with the interior of the nut and biasing the portion of the housing towards the first surface to form an identified length.

18. The method of claim 16 further comprising:
selecting a bolt having at least one of a desired grip length and a desired shank length using the identified length for the bolt to form a selected bolt.

19. The method of claim 18 further comprising:
installing the selected bolt into the hole with the nut.

20. An apparatus comprising:
a housing;
a clamping unit associated with the housing, wherein the clamping unit is capable of being inserted through a hole in a structure into an interior of a nut that is positioned relative to a first surface of the structure and capable of engaging the interior of the nut when a portion of the housing is positioned relative to a second surface of the structure, wherein the first surface is substantially parallel to the second surface;
a biasing system capable of biasing the portion of the housing that is positioned relative to the second surface of the structure and the clamping unit, while the clamping unit is engaged with the interior of the nut, and wherein the biasing system comprises:
a first spring, wherein the first spring is capable of biasing the clamping unit to engage the interior of the nut; and
a second spring capable of biasing the portion of the housing positioned relative to the second surface of the structure and the clamping unit towards each other while the clamping unit is engaged with the interior of the nut; and
a length indicator capable of indicating a length when the biasing system has biased the portion of the housing and the clamping unit.

* * * * *

UNITED STATES PATENT AND TRADEMARK OFFICE
CERTIFICATE OF CORRECTION

| | | |
|---|---|---|
| PATENT NO. | : 7,913,414 B2 | Page 1 of 1 |
| APPLICATION NO. | : 12/406301 | |
| DATED | : March 29, 2011 | |
| INVENTOR(S) | : Mark D. Bumgardner et al. | |

It is certified that error appears in the above-identified patent and that said Letters Patent is hereby corrected as shown below:

Title Page 1, item (75): Inventors: Fifth inventor, Ed Vallejos, should be removed and replaced by his full legal name Arnold E. Vallejos.

Signed and Sealed this
Tenth Day of May, 2011

David J. Kappos
*Director of the United States Patent and Trademark Office*